US009311559B2

(12) United States Patent
Fernández Berni et al.

(10) Patent No.: US 9,311,559 B2
(45) Date of Patent: Apr. 12, 2016

(54) DEVICE FOR THE HARDWARE DETECTION OF LOCAL EXTREMES IN AN IMAGE

(71) Applicants: UNIVERSIDAD DE SEVILLA, Sevilla (ES); CONSEJO SUPERIOR DE INVESTIGACIONES CIENTÍFICAS (CSIC), Madrid (ES)

(72) Inventors: Jorge Fernández Berni, Sevilla (ES); Ángel Rodríguez Vázquez, Sevilla (ES); Ricardo Carmona Galán, Sevilla (ES)

(73) Assignees: Universidad de Sevilla, Sevilla (ES); Consejo Superior de Investigaciones Cientificas (CSIC), Madrid (ES)

( * ) Notice: Subject to any disclaimer, the term of this patent is extended or adjusted under 35 U.S.C. 154(b) by 0 days.

(21) Appl. No.: 14/434,212

(22) PCT Filed: Oct. 8, 2013

(86) PCT No.: PCT/ES2013/000225
§ 371 (c)(1),
(2) Date: Jun. 17, 2015

(87) PCT Pub. No.: WO2014/057146
PCT Pub. Date: Apr. 17, 2014

(65) Prior Publication Data
US 2015/0310298 A1    Oct. 29, 2015

(30) Foreign Application Priority Data
Oct. 8, 2012   (ES) .................................. 201201011

(51) Int. Cl.
G06K 9/48       (2006.01)
G06K 9/46       (2006.01)
(Continued)

(52) U.S. Cl.
CPC .......... *G06K 9/4604* (2013.01); *G06K 9/00986* (2013.01); *G06K 9/56* (2013.01); *G06T 1/20* (2013.01)

(58) Field of Classification Search
None
See application file for complete search history.

(56) References Cited

U.S. PATENT DOCUMENTS

2003/0108221 A1    6/2003  Stevenson et al.
2005/0219094 A1*  10/2005  Murphy ............... H03K 17/785
                                                         341/133
(Continued)

FOREIGN PATENT DOCUMENTS

EP         1 580 814 A1    9/2005

OTHER PUBLICATIONS

S. Badel, et al., "Mixed Analog-Digital Image Processing Circuit Based on Hamming Artificial Neural Network Architecture," Swiss Federal Institute of Technology, 2004, pp. 780-783.
(Continued)

*Primary Examiner* — Stephen R Koziol
*Assistant Examiner* — Amandeep Saini
(74) *Attorney, Agent, or Firm* — McNees Wallace & Nurick LLC

(57) ABSTRACT

A device and method for the hardware detection of local edges in an image, comprised of a plurality of elemental cells for mixed signal processing, locally interconnected with each other, comprising in each cell a first switch configured to enable the pre-charging of a condenser at the supply voltage; and where once said condenser is pre-charged, it discharges via a second switch connected to a power source which varies in a monotonically increasing manner with the analog voltage representing the value of the pixel concerned; and where the value of the pixel is compared asynchronously with the neighboring pixels of the neighboring cells via two inverters, a digital NOR gate, a digital NAND gate, a third and fourth switch and a memory feature to store the result.

9 Claims, 2 Drawing Sheets

(51) Int. Cl.
   *G06K 9/00* (2006.01)
   *G06K 9/56* (2006.01)
   *G06T 1/20* (2006.01)

(56) References Cited

U.S. PATENT DOCUMENTS

2005/0240647 A1 10/2005 Banihashemi et al.
2011/0242418 A1 10/2011 Hosokawa et al.

OTHER PUBLICATIONS

R. Dlugosz, et al., "A Low Power Current-Mode Binary-Tree WTA/LTA Circuit for Kohonen Neural Networks," 16th International Conference, "Mixed Design of Integral Circuits and Systems," Jun. 25-27, 2009, pp. 201-204.

B. Tomatsopoulos, et al., "Low Power, Low Complexity CMOS Multiple-Input Replicating Current Comparators and WTA/LTA Circuits," Department of Electronic and Electrical Engineering, University College, 4 pgs, rec'd Jun. 2015.

L. Sanc ex Gaspariano, et al., "High-Precision Current-Based CMOS WTA/LTA Filters," 17th International Conference on Electronics, Communications and Computers, 2007, 6 pgs.

J. Dubois, et al., "A 10 000 fps CMOs Sensor With Massively Parallel Image Processing," IEEE Journal of Solid-State Circuits, vol. 43, No. 3, Mar. 2008, pp. 706-717.

M. Rahman, et al., "A High Speed and High Resolution VLSI Winner-Take-All Circuit for Neural Networks and Fuzzy Systems," National Institute of Technology Silchar, 2009, 4 pgs.

D. Moro-Frias, et al., "A Novel Current-Mode Winner-Take-All Topology," 2011 20th European Conference on Circuit Theory and Design, pp. 134-137.

H. Hsieh, et al., "A Low-Power, High-Resolution WTA Utilizing Tranlinear-Loop Pre-Amplifier," 2010, 5 pgs.

Z. Gunay and E. Sanchez-Sinencio, "CMOS Winner-Take-All Circuits: A Detail Comparison," 1997 IEEE International Symposium on Circuits and Systems, Jun. 9-12, 1997, pp. 41-44.

J. Fernandez-Berni, et al., "Flip-Q: A QCIF Resolution Focal-Plane Array for Low-Power Image Processing," IEEE Journal of Solid-State Circuits, vol. 46, No. 3, Mar. 2011, pp. 669-680.

P. Dudek, "Scamp-3: A Vision Chip With SIMD Current-Mode Analogue Processor Array," The University of Manchester, Manchester, UK, 2011, pp. 17-43.

\* cited by examiner

DEVICE FOR THE HARDWARE DETECTION OF LOCAL EXTREMES IN AN IMAGE

The object of the present invention is a hardware device which enables the detection of local maxima and minima in the processing of an image. The hardware which is the object of this invention is included within the framework of the so-called Winner-Take-All (WTA) or Loser-Take-All (LTA) circuits. The scientific-technical area of the invention is that of physical technologies; specifically micro-electronics. Its general scope of application would be that of electronic devices with very low power consumption designed to carry out artificial vision operations; that is, the capture of images, the analysis of the same and the taking of action should this be required by the results of said analysis. Numerous examples of specific applications of these devices might be suggested here: the monitoring of industrial processes, the monitoring of natural spaces, the automatic surveillance of public places, robotics, or to aid unmanned aerial navigation, among others.

BACKGROUND OF THE INVENTION

The functions implemented by this invention—the detection of local maxima and minima in an image—may be performed in different ways. One option is by means of general-purpose calculation digital systems. These systems may be programmed to process images, obtaining a result similar to that of the hardware proposed herein. To cite an example, a typical scenario might be the development of software for the analysis of images on a PC. This software would execute a series of instructions by means of the corresponding microprocessor until the desired result is achieved. The main advantage of this approach is the flexibility to undertake any type of task due to the generalistic nature of the underlying hardware. However, this advantage becomes a drawback when the specifications of a particular application require only a limited array of the functions provided by this type of system, but with a much lower power consumption and similar or even higher levels of performance, with regard to the number of operations per second. The non-specific nature of the hardware is precisely what prevents the fulfillment of said requirements on the majority of occasions. It is, however, possible to find a number of alternatives from the purely digital point of view, where the hardware may be progressively adjusted in order to obtain better performance parameters. Thus, we could consider the possibility of using digital signal processors optimised for the execution of certain operations which are useful for the processing of images, such as convolution, for example. Another option might be the implementation of processing primitives in reconfigurable integrated circuits such as FPGAs (Field-Programmable Gate Arrays) or CPLDs (Complex Programmable Logic Devices). As a last resort, digital circuitry specific for a particular application could be designed and integrated in a chip, thus obtaining the highest levels of performance and energetic efficiency.

The present invention falls beyond the context of exclusively digital implementation described above, and therefore differs in essence from any methodology based on the same. The fundamental difference lies in that, although in our case the basis is also the design of specific hardware for its integration in a chip, this hardware makes use of mixed signal circuitry, handling both analogue and digital signals. This characteristic enables the maximum exploitation of the physics of the transistors when processing the electrical signals representing the pixel values of an image, enabling the obtaining of better performance and power consumption values than an equivalent digital implementation. Many examples may be found reported in the literature concerning mixed signal circuitry for the processing of images [C. N. Stevenson, R. M. Lesperance, F. J. Schauerte and J. R. Troxell, "Image sensor method and apparatus having hardware implemented edge detection processing," US Patent 2003/0108221 A1, Dec. 6, 2003; J. Dubois, D. Ginhac, M. Paindavoine, and B. Heyrman, "A 10000 FPS CMOS sensor with massively parallel image processing," *IEEE J. Solid-State Circuits*, vol. 43, no. 3, pp. 706-717, 2008; P. Dudek, "*SCAMP-3: A vision chip with SIMD current-mode analogue processor array,*" *Focal-plane Sensor-Processor Chips*, published by Springer, 2011; J. Fernández Berni, R. Carmona Galán and Luis Carranza Gonzalez, "*FLIP-Q: A QCIF resolution focal-plane array for low-power image processing,*" *IEEE J. Solid-State Circuits*, vol. 46, no. 3, pp. 669-680, 2011].

The above examples are based on the processing architecture described in [A. Rodriguez Vázquez, S. Espejo Meana and R. Dominguez Castro, "Programmable mixed-signal integrated circuit architecture for the production of autonomous vision systems in a single chip and/or pre-processing of images in higher-level systems," Patent EP 1 580 814 (A1), Sep. 28, 2005]. This architecture is characterised by a two-dimensional array of interconnected elemental processors concurrently working together to perform a particular operation on an image.

The present invention is also supported by this processing hardware structure, as are other implementations [B. Amir and H. Saied, "Full CMOS minsum analog iterative decoders," Patent US2005240647 (A1); L. A. Sánchez-Gaspariano, A. Diaz-Sánchez, G. Saldaña-González, "*High-precision current-based CMOS WTA/LTA filters,*" *Int. Conference on Electronics, Communications and Computers*, 2007; M. Rahman, K. Baishnab, and F. Talukdar, "*A high speed and high resolution VLSI winner-take-all circuit for neural networks and fuzzy systems,*" *Int. Symp. on Signals, Circuits and Systems*, 2009; M. T. Moro-Frias, D. and Sanz-Pascual and C. A. de la Cruz Blas, "*A novel current-mode winner-take-all topology,*" *European Conf. on Circuit Theory and Design*, 2011, pp. 134-137; B. Tomatsopoulos and A. Demosthenous, "*Low power, low complexity CMOS multiple-input replicating current comparators and WTA/LTA circuits,*" *European Conf. on Circuit Theory and Design*, 2005, pp. 241-244; H. Hung-Yi, T. Kea-Tiong, T. Zen-Huan, and C. Hsin, "*A low-power, high-resolution WTA utilizing translinear-loop pre-amplifier,*" *Int. Conf. on Neural Networks*, 2010; R. Dlugosz and T. Talaska, "*A low power current-mode binary-tree WTA/LTA circuit for Kohonen neural networks,*" *Int. Conf. on Mixed Design of Integrated Circuits and Systems*, 2009, pp. 201-204] with the same functions, but whose mixed signal circuitry differs from that proposed in this specification. It is precisely this original circuitry which enables the obtaining of a much lower power consumption than any other hardware previously reported.

The hardware which is the object of this invention is included within the framework of the so-called Winner-Take-All (WTA) or Loser-Take-All (LTA) circuits. These circuits enable the assessment of the highest value—WTA—and lowest value—LTA—in an array of input signals. Said signals may be represented either by voltages or by intensities. Specifically, when applied to the processing of images, the WTA and LTA hardware blocks enable the detection of the local edges of an image; that is, those pixels whose values are the highest—maximum—or the lowest—minimum—with regard to their eight neighbouring pixels.

P201030867-137]. In this approach, the operation is supported by an array of similar processing cells, each managed by the corresponding input signal to be processed. These cells are interconnected by means of a common power source in such a way that a concurrent "competition" arises among all the cells in order to obtain the greatest quantity possible of said power. Ultimately, only one of the cells will remain active, either the winner or the loser, according to the configuration selected.

The other approach is not based on a concurrent interaction of all the signals to be processed, but on a pair processing tree [B. Tomatsopoulos and A. Demosthenous, "*Low power, low complexity CMOS multiple-input replicating current comparators and WTA/LTA circuits,*" European Conf. on Circuit Theory and Design, 2005, pp. 241-244; H. Hung-Yi, T. Kea-Tiong, T. Zen-Huan, and C. Hsin, "*A low-power, high-resolution WTA utilizing translinear-loop pre-amplifier,*" Int. Conf. on Neural Networks, 2010]. Thus, the array of signals to be processed is divided into pairs and compared at a first processing level. Only the winners—WTA—or the losers—LTA—reach the next processing level, where comparisons by pairs are performed once again. Ultimately, subsequent to performing the comparison at the final level, the global winner or loser will be obtained.

There also exist a number of hardware structures which may be considered to be hybrid with regard to the above description [R. Dlugosz and T. Talaska, "*A low power current-mode binary-tree WTA/LTA circuit for Kohonen neural networks,*" Int. Conf. on Mixed Design of Integrated Circuits and Systems, 2009, pp. 201-204].

EXPLANATION OF THE INVENTION

The WTA-LTA circuit for detection of local edges in an image, which is the object of this invention, operates in voltage mode, and its operation is not similar to any of the approaches described above. Specifically, the operation is based on the pre-charging of a condenser and its subsequent discharge by means of a power source dependent on the voltage representing the pixel concerned. Said discharge is compared constantly with that produced in the neighbouring pixels via digital logical gates, a NOR gate for calculation of the minima and a NAND gate for calculation of the maxima. The result of said comparison is stored in a memory feature whose digital output will be read appropriately in accordance with the type of edge to be detected.

Specifically, the object of the present invention is a device for the hardware detection of local edges in an image, comprised of a plurality of elemental cells for mixed signal processing, locally interconnected in such a way that each cell is only interconnected with its eight neighbouring cells, there being no direct interaction beyond this periphery, and characterised in that each cell comprises at least one first switch configured to enable the pre-charging of a condenser at the supply voltage; and where once said condenser is pre-charged, it discharges via a second switch connected to a current source which varies in a monotonically increasing manner with the analogue voltage representing the value of the pixel concerned; and where the value of the pixel is compared asynchronously with the neighbouring pixels of the neighbouring cells via two inverters, a digital NOR gate, a digital NAND gate, a third and fourth switch and a memory feature to store the result.

The inverters bring about a change in the output signal of the second inverter exactly at the instant in time when the discharge of the condenser causes its voltage to cross the input threshold voltage of the first inverter, the output of the inverter being connected to the input of the corresponding digital NOR and NAND gates of its neighbouring cells and to the input of a memory feature.

On activation of its output switch, a digital NOR gate enables the determination as to whether its associated pixel value constitutes a local minimum; to this end it should be connected to the input of the clock of the memory feature.

Likewise, on activation of its output switch, a digital NAND gate enables the determination as to whether its associated pixel value constitutes a local maximum; to this end it should be connected to the input of the clock of the memory feature.

Likewise, an object of the present invention also comprises a method for the hardware detection of local edges in an image, comprised of a plurality of elemental cells for mixed signal processing, locally interconnected with each other in such a way that each cell is only interconnected with its eight neighbouring cells, there being no direct interaction beyond this periphery, put into effect in a device which is the object of the invention and which is characterised in that it comprises a first stage of pre-charging a condenser and its subsequent discharge via a power source dependent on the voltage representing the pixel concerned; and a second stage where said discharge is compared constantly with that produced in the neighbouring pixels via digital logical gates, a NOR gate for calculation of the minima and a NAND gate for calculation of the maxima; and where the result of said comparison is stored in a memory feature whose digital output will be read appropriately in accordance with the type of edge to be detected.

The device of the invention will be formed by identical elemental cells for the processing of mixed signals which form a plurality by means of their grouping and local interconnection. By "local" it is understood that each cell is interconnected only with its eight neighbouring cells, there being no direct interaction beyond that periphery.

Throughout the description and the claims, the word "comprise" and its variants shall not exclude other technical characteristics, addenda, components or steps. For those skilled in the art, other objects, advantages and characteristics of the invention will become apparent in part from the description and in part from the practice of the invention. The following examples and drawings are provided for illustrative purposes, and are not intended to be limitative of the present invention. Furthermore, the present invention covers all possible combinations of preferred and particular embodiments indicated herein.

DETAILED EXPLANATION OF EMBODIMENTS AND EXAMPLES

Figure 1:
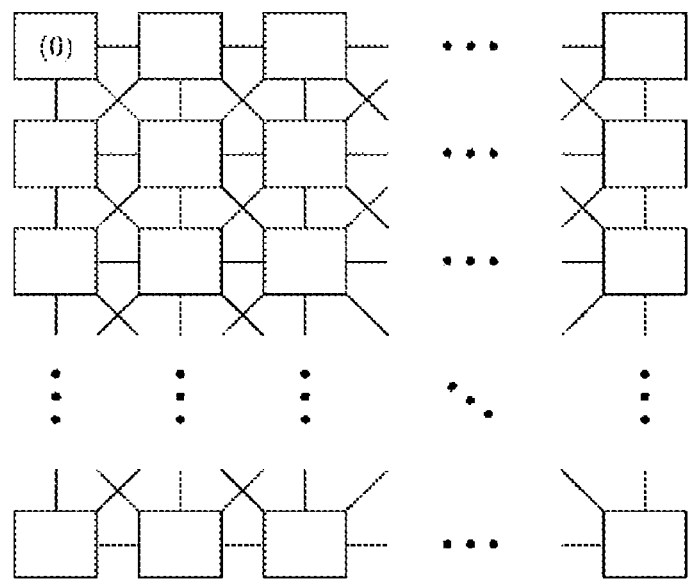
FIG. 1: the basic structure of the proposed hardware, i.e. a regular two-dimensional spatial distribution of identical locally interconnected processing cells.

In essence, the device of the invention features a plurality of cells, where each cell features at least one switch (1) which enables the pre-charging of the condenser (4) at supply voltage. Next, once pre-charged, it is discharged via the switch (2) connecting it to the power source (3) whose fundamental characteristic lies in that it varies in a monotonically increasing manner with the analogue voltage $V_{px_{ij}}$ representing the value of the pixel concerned. Thus, values greater than $V_{px_{ij}}$ entail higher voltage and vice versa. This implies that the time interval taken by the voltage $V_{d_{ij}}$ to reach the input threshold voltage of the first inverter (5) will depend on said pixel voltage. This information, that of the crossing between $V_{d_{ij}}$ and the input threshold voltage of the inverter (5), is distributed to the neighbours of the cell under study via the switchover of the $V_{o_{ij}}$ voltage from '1' logic to '0' logic. This voltage is the output voltage of the second inverter (6). In turn, the $V_{o_{mn}}$ voltages from the neighbouring cells assume the role of inputs to the current cell. More specifically, they constitute the inputs of two digital gates, one NOR (7) and one NAND (8). The NOR gate (7) enables the detection of the minimum among the neighbouring pixels and the current pixel, while the NAND gate (8) enables detection of the maximum. To this end, either switch (9) or switch (10) respectively should be activated. Finally, the result of the operation performed, this being the detection of either the minimum or the maximum, is stored in a memory feature, specifically a D-type flip-flop (11). Thus, a '1' logic at $V_{m_{ij}}$ indicates that the current pixel is a minimum, while a '1' logic at $V_{M_{ij}}$ indicates that the current pixel is a maximum.

Figure 2:
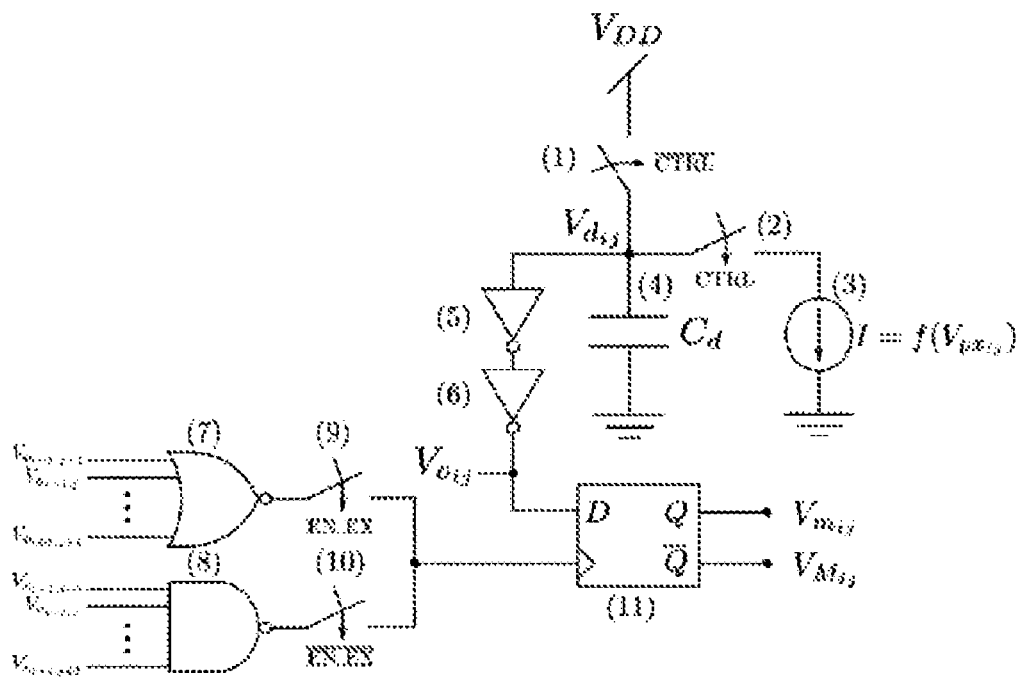
FIG. 2: an elemental processing unit of the regular spatial distribution depicted in FIG. 1.

Our invention might be defined, in general terms, as low power-consumption hardware based on mixed signal circuitry for the detection of local maxima and minima in an image. It is characterised by a regular two-dimensional spatial distribution of identical locally interconnected processing cells, as depicted in FIG. 1. Each cell features, at least, the circuitry depicted in FIG. 2, the object of this invention. The operation of detecting the local edges is carried out as follows. During a certain time interval, the digital 'CTRL' signal which operates both switches (1) and (2) should be set at '0' logic. This entails the pre-charging of the condenser (4) at the supply voltage $V_{DD}$. Once said pre-charging is complete, 'CTRL' should be switched to '1' logic, and from that moment on, the detection of the corresponding edge, maximum or minimum, occurs asynchronously, i.e. without the intervention of any signal from an external clock controlling the operation. At the instant when 'CTRL' switches to '1' logic, this enables the discharge of the condenser (4) via a power source whose fundamental characteristic lies in that it varies in a monotonically increasing manner with the analogue voltage $V_{px_{ij}}$ representing the value of the pixel concerned. Thus, the voltage provided by said source will be higher for values greater than $V_{px_{ij}}$ and vice versa. This implies that the time interval required for the voltage $V_{d_{ij}}$ to cross the input threshold voltage of the inverter (5) will ultimately depend on $V_{px_{ij}}$. The instant in time $_{tc}$, when this crossing occurs becomes known to the neighbouring cells via the switchover of the $V_{o_{ij}}$ voltage from '1' logic to '0' logic. This voltage corresponds to the output of the second inverter (6). In turn, the $V_{o_{mn}}$ voltages from the neighbouring cells constitute inputs to the current cell. More specifically, they constitute inputs of two digital gates, a NOR gate (7) and a NAND gate (8). The NOR gate is associated with the detection of the minimum. Just when 'CRTL' switches from '0' to '1', all its inputs are logic '1's, as all the condensers are pre-charged to $V_{DD}$. As the discharge process progresses in all the cells, each of these inputs will switch to '0' until finally the last one will do this at the instant in time $t_m$. At that instant in time, if the 'EN_EX' signal which controls the switches (9) and (10) is set at '1', the input of the D-type flip-flop (11) will be captured and stored. If the discharge of the condenser (4) associated with the current cell is the slowest, in comparison with that of its neighbours, the current pixel is a local minimum, in accordance with the aforementioned dependence of its value on the power source. This will be reflected by a logic '1' at $V_{m_{ij}}$, as at $t_m$ the flip-flop input will be a logic '1'. Conversely, if the discharge is not the slowest, the pixel is not a minimum, and the flip-flop input at $t_m$ will correspond to a logic '0', a value which will be stored at $V_{m_{ij}}$. Likewise, the NAND gate enables the detection of a local maximum, on condition that 'EN_EX' is set at '0'. In this case, the switchover of any of its inputs from '1' to '0' entails the storing of the flip-flop input signal at that instant in time; let us call it $t_M$. If said input remains at '1' at $t_M$, this means that the discharge is not the most rapid in comparison with that of its neighbours, and therefore the pixel is not a local maximum. This will imply the storage of a logic '0' at $V_{m_{ij}}$. Conversely, if the flip-flop input switched over to '0' prior to $t_M$, the current discharge is the most rapid, and therefore the pixel constitutes a local maximum. As a result, a logic '1' will be stored at $V_{m_{ij}}$.

Figure 3:
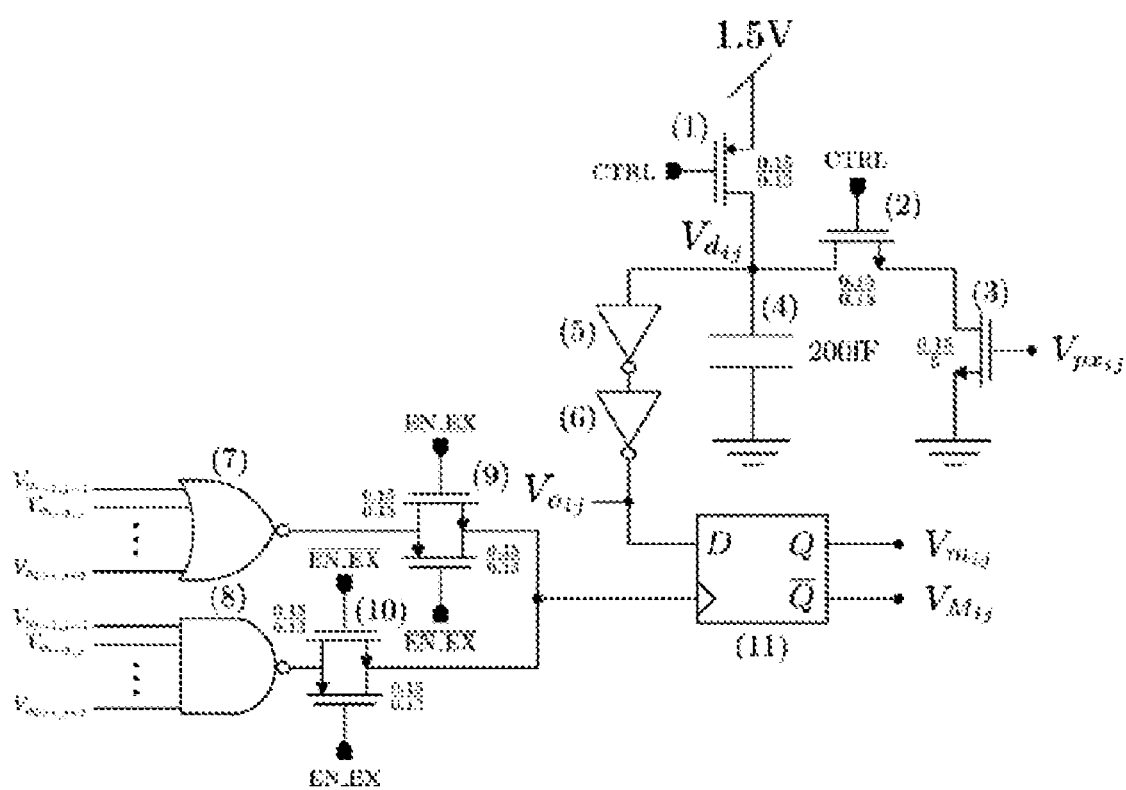
FIG. 3: an example of an embodiment of the elemental processing unit depicted in FIG. 2. This example has been designed for a standard CMOS technology of 0.13 μm and 1.5V.

FIG. 3 depicts an operative example of the implementation of the basic processing cell. The design has been executed for a standard CMOS technology of 0.13 μm and 1.5V. In the aforementioned figure the dimensions of each of the transistors comprising the proposed processing circuitry are depicted, as are the digital logic gates used, which come from the standard technology library. The pre-charge/discharge capability and the supply voltage are also depicted. Likewise, the mapping between the different elements of the circuit enumerated in FIG. 2 may be seen, and their correspondence in FIG. 3. The voltage-dependent power source is deployed by means of a single nMOS transistor. On the other hand, while switches (2) and (3) are also deployed by a single transistor, pMOS and nMOS respectively, switches (9) and (10) each require a respective transmission gate, each of which is comprised of 2 transistors, one nMOS and the other pMOS. Finally, for the circuit in FIG. 3, a pre-charge interval of at least 50 ns is required. The reading of the result of the operation via the $V_{m_{ij}}$ and $V_{M_{ij}}$ voltages could be executed after at least 300 ns subsequent to the completion of said pre-charging interval. This is the approximate time required to complete the detection of the edges, accounting for a $V_{px_{ij}}$ signal range of C[0.75,1.5]V.

The invention claimed is:

1. A device for the hardware detection of local edges in an image with at least a pixel, comprising a plurality of elemental cells for mixed signal processing, locally interconnected in such a way that each cell is only interconnected with its eight neighbouring cells, there being no direct interaction beyond this periphery, and each cell further comprising at least one first switch configured to enable the pre-charging of a condenser at the supply voltage; where once said condenser is pre-charged, it discharges via a second switch connected to a current source which varies in a monotonically increasing manner with the analogue voltage representing the value of the pixel concerned; where the value of the pixel is compared asynchronously with the neighbouring pixels of the neighbouring cells via:
    a first inverter fitted with at least an input, an output and an input threshold voltage,
    a second inverter fitted with at least an input and an output,
    a digital NOR gate fitted with at least an input and an output,
    a digital NAND gate fitted with at least an input and an output,
    a third and fourth switch, and
    a memory feature fitted with at least two inputs and two outputs, wherein one of the inputs is an input of a clock, to store the result.

2. The device of claim 1, wherein the first and second inverters bring about a change in the output of the second inverter exactly at the instant in time when the discharge of the condenser causes its voltage to cross an input threshold voltage of the first inverter.

3. The device of claim 1, wherein the output of the second inverter is connected to the input of the corresponding digital NOR and NAND gates of its neighbouring cells.

4. The device of claim 1, wherein the output of the second inverter is connected to the input of a memory feature.

5. The device of claim 1, wherein the digital NOR gate enables by means of the activation of the third switch the determination of whether its associated pixel value constitutes a local minimum.

6. The device of claim 5, wherein the output of the NOR gate is connected to the input of the clock of the memory feature by means of the activation of the third switch to carry out the determination of whether its associated pixel value constitutes a local minimum.

7. The device of claim 1, wherein the digital NAND gate enables by means of the activation of the fourth switch the determination of whether its associated pixel value constitutes a local maximum.

8. The device of claim 6, wherein the output of the NAND gate is connected to the input of the clock of the memory feature by means of the activation of the fourth switch to carry out the determination of whether its associated pixel value constitutes a local maximum.

9. A method for the hardware detection of local edges in an image with at least a pixel, comprising a plurality of elemental cells for mixed signal processing, locally interconnected with each other in such a way that each cell is only interconnected with its eight neighbouring cells, there being no direct interaction beyond this periphery, which further comprising:
   a first stage of pre-charging a condenser and its subsequent discharge via a current source dependent on the voltage representing the pixel concerned; a second stage where said discharge is compared constantly with that produced in the neighbouring pixels via digital logical gates, a NOR gate for calculation of the minima and a NAND gate for calculation of the maxima; and
   where the result of said comparison is stored in a memory feature whose digital output will be read appropriately in accordance with the type of edge to be detected.

* * * * *